United States Patent
Cossel et al.

(10) Patent No.: US 7,219,231 B2
(45) Date of Patent: May 15, 2007

(54) EXTENSIBLE AUTHENTICATION SYSTEM AND METHOD

(75) Inventors: Travis Myron Cossel, Boise, ID (US); Chris Richard Gunning, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 789 days.

(21) Appl. No.: 10/060,780

(22) Filed: Jan. 30, 2002

(65) Prior Publication Data

US 2003/0145220 A1    Jul. 31, 2003

(51) Int. Cl.
*H04L 9/00* (2006.01)
(52) U.S. Cl. .......................... 713/168; 713/170; 726/2; 726/3; 726/4; 709/225
(58) Field of Classification Search ................ 713/153, 713/156, 182, 193, 200, 201, 1, 168, 170, 713/189; 380/278; 709/203, 204, 206, 226, 709/217, 225, 229; 726/2–9, 26–27
See application file for complete search history.

(56) References Cited

U.S. PATENT DOCUMENTS

| | | | | |
|---|---|---|---|---|
| 5,761,309 | A * | 6/1998 | Ohashi et al. | 713/156 |
| 6,055,636 | A * | 4/2000 | Hillier et al. | 713/200 |
| 6,327,659 | B2 * | 12/2001 | Boroditsky et al. | 713/182 |
| 6,446,204 | B1 * | 9/2002 | Pang et al. | 713/153 |
| 6,615,264 | B1 * | 9/2003 | Stoltz et al. | 709/227 |
| 6,651,168 | B1 * | 11/2003 | Kao et al. | 713/185 |
| 6,785,713 | B1 * | 8/2004 | Freeman et al. | 709/208 |
| 2002/0069247 | A1 * | 6/2002 | Paknad et al. | 709/204 |
| 2002/0099822 | A1 * | 7/2002 | Rubin et al. | 709/225 |
| 2003/0046391 | A1 * | 3/2003 | Moreh et al. | 709/225 |
| 2003/0159055 | A1 * | 8/2003 | Robbins et al. | 713/193 |

* cited by examiner

*Primary Examiner*—Kim Vu
*Assistant Examiner*—Yin-Chen Shaw (57) ABSTRACT

A system, method, and a program embodied on a computer readable medium for performing authentication tasks is provided. In one embodiment, the system comprises a number of authentication agents, each of the authentication agents authenticating at least one user parameter by performing at least one authentication task. The system also includes an authentication manager that requests each of the authentication agents to authenticate an unauthenticated user parameter.

20 Claims, 4 Drawing Sheets

EXTENSIBLE AUTHENTICATION SYSTEM AND METHOD

CROSS REFERENCE TO RELATED APPLICATIONS

This application is related to co-pending U.S. Patent Application entitled "Parameter Verification in an Authentication System and Method", accorded Ser. No. 10/060,620, filed on even date herewith, and is now U.S. Pat. No. 7,107,615.

TECHNICAL FIELD

The present invention is generally related to the field of authentication and, more particularly, is related to an extensible authentication system and method.

BACKGROUND OF THE INVENTION

Multifunction peripherals have become more and more common in the workplace and in the home. Typical multifunction peripherals often combine the functions of printing, faxing, scanning, and copying into a single device or system. Previously, offices may have had to purchase a printer for computers to print, a facsimile machine to transmit and receive faxes, a scanner to scan documents, and a copy machine to make copies. Now all of these functions are being combined in a single device to save workspace and provide significant cost savings and efficiency. In addition, some multifunction peripherals may provide digital sending capability that enables users to scan a document into digital form and then send the resulting digital document.

While a single multifunction peripheral may provide many different functions, it may not be the case that all individuals should have access to all of the capabilities thereof. In some cases, specific individuals may be provided with access to specific functions using some sort of security or authentication routine that limits access to specific functions to specified users. However, as more and more different functions are integrated into multifunction peripherals or any other machine that limits access to specific functions in a similar manner, the security and/or authentication systems used with such devices have to be restructured in order to limit access to such new functionality. This results in inefficiency and additional cost to adapt previous security and/or authentication systems for new functions on a device of restricted use.

SUMMARY OF THE INVENTION

In light of the foregoing, the present invention provides for a system, method, and a program embodied on a computer readable medium to perform authentication tasks. In one embodiment, the system comprises a number of authentication agents, each of the authentication agents authenticating at least one user parameter by performing at least one authentication task. The authentication task may or may not be unique with respect to the remaining ones of the authentication agents. The system also includes an authentication manager that requests each of the authentication agents to authenticate an unauthenticated user parameter.

In another embodiment, the present invention provides for a method for authentication that comprises the steps of providing for a number of authentication agents, each of the authentication agents being configured to perform at least one authentication task, requesting each of the authentication agents to authenticate an unauthenticated user parameter, and, obtaining a response from each of the authentication agents indicating whether the unauthenticated user parameter has been authenticated.

In still another embodiment, the present invention provides for a computer program embodied on a computer readable medium for performing authentication. In this regard, the program comprises code that embodies a number of authentication agents, each of the authentication agents authenticating at least one user parameter by performing at least one authentication task, and, code that embodies an authentication manager that requests each of the authentication agents to authenticate an unauthenticated user parameter.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
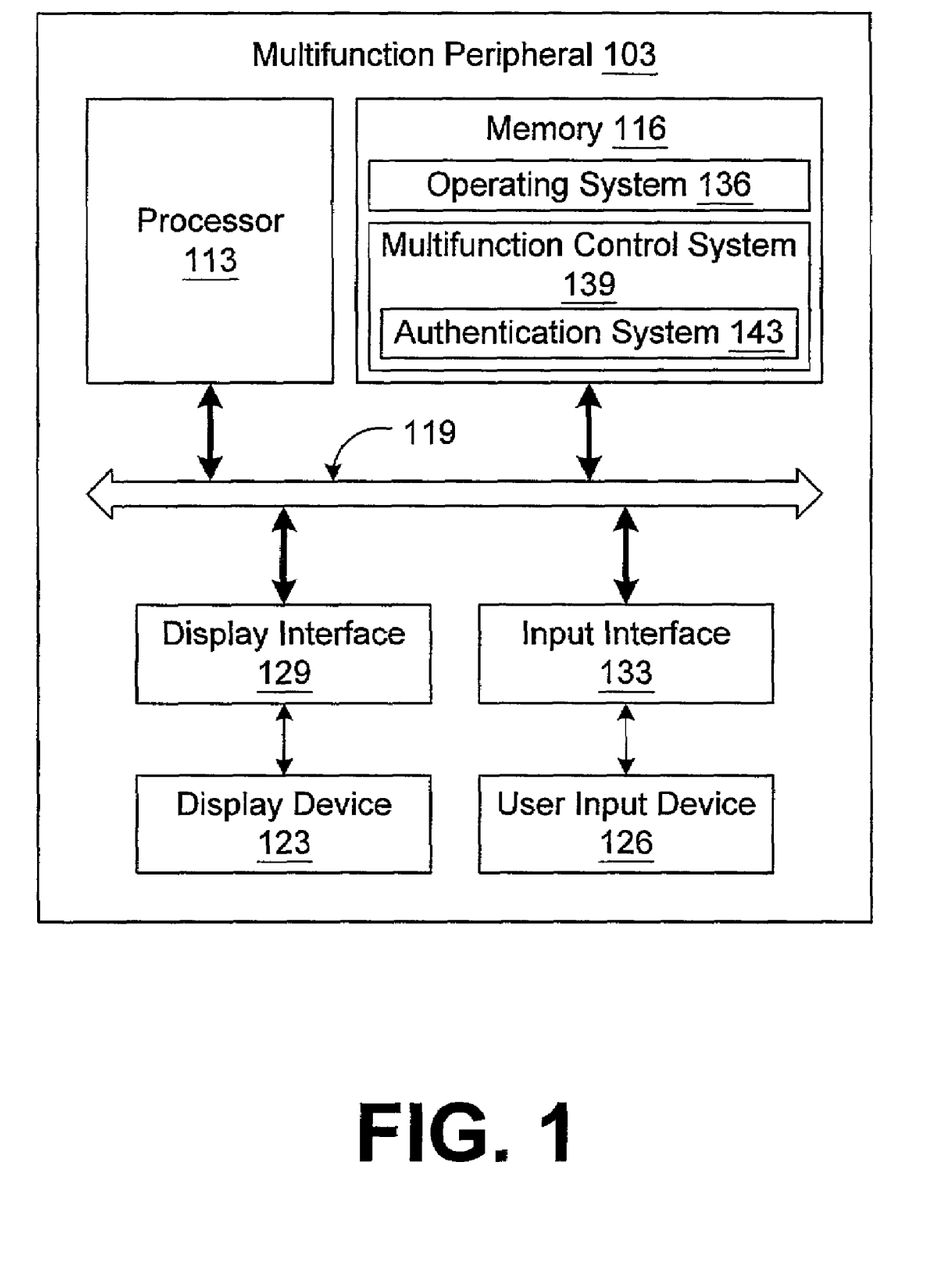
FIG. 1 is a drawing of a multifunction peripheral that employs an authentication system according to an embodiment of the present invention.

With reference to FIG. 1, shown is a multi-function peripheral 103 according to an embodiment of the present invention. The multi-function peripheral 103 is a device that combines the operations of several other devices such as, for example, a copy machine, a scanner, a printer, a digital sender, and other devices. It may be the case that access to the various functions performed by the multi-function peripheral 103 is to be restricted to various individuals. The multi-function peripheral 103 includes an authentication system to verify that a user is whom they say they are in order to provide access to the functions of the multi-function peripheral 103 to which that individual is entitled.

In this respect, the multi-function peripheral 103 includes a processor 113 and a memory 116, both of which are coupled to a local interface 119. The local interface 119 may be, for example, a data bus with an accompanying control/address bus as can be appreciated by those with ordinary skill in the art. The processor 113, memory 116, and the local interface 119 make up a processor circuit that is generally known by those with ordinary skill in the art. The multi-function peripheral 103 may also include one or more display devices 123 and one or more user input devices 126. The display device 123 is coupled to the local interface 119 by virtue of the display interface 129. Correspondingly, the user input device 123 is coupled to the local interface 119 through one or more input interfaces 133. In this respect, the display interface 129 and the input interface 133 may comprise, for example, appropriate input/output cards or other such devices as are generally known by those with ordinary skill in the art.

The multifunction peripheral 103 may also include a number of components that are employed to perform the various functions of copying, scanning, printing, digital sending and other functions. Such components may include, for example, paper path hardware to guide paper during the performance of the various functions, a printing assembly, scanning sensors and other scanning hardware, copying hardware, and other components. Such components are generally known by those with ordinary skill in the art and not discussed herein in detail.

The input devices may comprise, for example, a keyboard, keypad, touch pad, touch screen, microphone, or one or more push buttons, etc. The display devices may comprises, for example, cathode ray tubes (CRTs), liquid crystal display screens, gas plasma-based flat panel displays, indicator lights, or other types of display devices, etc.

The multi-function peripheral 103 also includes various components that are stored on the memory 116 and are executable by the processor 113. These components include an operating system 136 and a multi-function control system 139. The multi-function control system 139 includes an authentication system 143 according to an aspect of the present invention.

The operating system 136 is executed to control the allocation and usage of hardware resources in the multifunction peripheral such as the memory, processing time and peripheral devices. In this manner, the operating system 136 serves as the foundation on which applications depend as is generally known by those with ordinary skill in the art.

The multi-function control system 139 is executed by the processor 113 in order to control the various operations of the multi-function peripheral 103 in performing various functions including copying, scanning, printing, digital sending, and any other functions that may be formed by the multi-function peripheral 103. The authentication system 143 is implemented in the multi-function peripheral 103 to authenticate a user to ensure that they are who they represent themselves to be and to limit access to the user to the various functions of the multi-function peripheral 103 to which that individual is entitled. In one embodiment, the authentication system 143 is programmed in an appropriate computer language, such as, for example, C, C++, Java, and other appropriate programming languages.

The memory 116 is defined herein as both volatile and nonvolatile memory and data storage components. Volatile components are those that do not retain data values upon loss of power. Nonvolatile components are those that retain data upon a loss of power. Thus, the memory 116 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 113 may represent multiple processors and the memory 116 may represent multiple memories that operate in parallel. In such a case, the local interface 119 may be an appropriate network that facilitates communication between any two of the multiple processors, between any processor and any one of the memories, or between any two of the memories etc. The processor 113 may be electrical or optical in nature.

Next, a discussion is provided of the general operation of the multi-function peripheral 103 in authenticating a user to provide access to the various functions of the multi-function peripheral 103. Assume that a user approaches the multi-function peripheral 103 to perform one of the various functions provided thereby. For example, assume that a user wishes to scan in a document and transmit the same in a digital form to another individual using electronic mail. This may be done where the multifunction peripheral 103 is coupled to a network using a digital sending capability of the multifunction peripheral 103. Further assume that the individual must be authenticated as there are a limited number of people who have access to the digital sending capability of the multifunction peripheral.

To begin, the user manipulates the user input device 126 to indicate the particular function that the user desires to employ on the multi-function peripheral 103, such as the digital sending capability. In response, the multi-function control system 139 implements the authentication system 143 to verify that the user is the person that they claim to be in order to implement the appropriate function that they desire. The authentication system 143 thus displays a request on the display device 123 that the user enter appropriate user parameters such as, for example, a user password or user name, etc. Alternatively, the user may be required to provide user parameters such as biometric identification information or other identifying indicia through the various user input devices 126 employed with the multi-function peripheral 103.

Such user input devices 126 may comprise, for example, a keyboard to enter a user name or password, as well as more complex user input devices 126, such as a retinal scanner, fingerprint scanner, and/or other input devices. The user inputs the user parameters using one or more of the user input devices 126. The authentication system 143 then verifies the user parameters. For example, the parameters to be entered may be a user's password and user name. Such information may be stored in a network server that is coupled to the multi-function peripheral 103 through a local area network or other network. The authentication system 143 may authenticate the user parameters by requesting that the network server verify that the user name and password are active on the network if such status provides access to the digital sending capabilities of the multifunction peripheral. Alternatively, such information may be maintained in a database that is consulted by the authentication system 143 to verify that the user has access to the digital sending capabilities.

Figure 2:
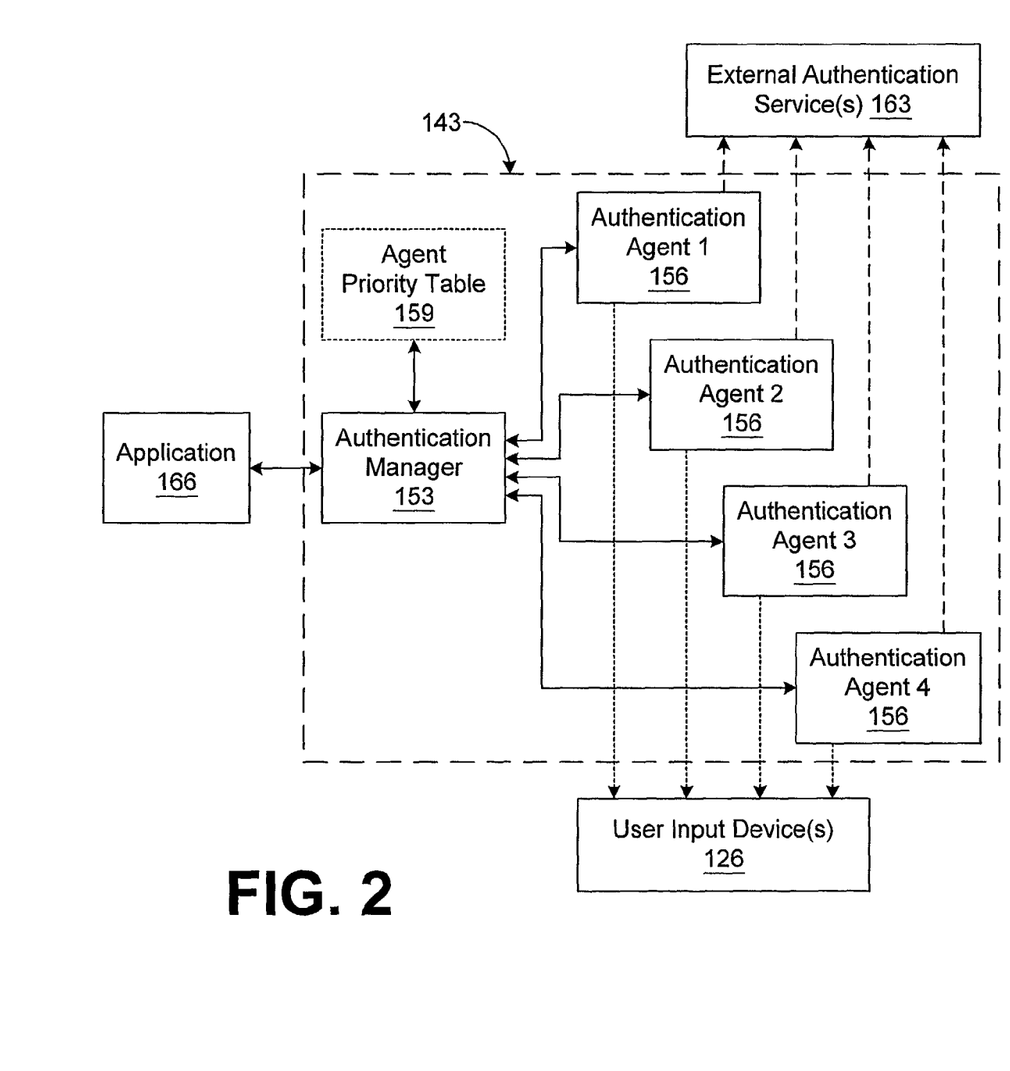
FIG. 2 is a block diagram of the authentication system employed in the multifunction peripheral of FIG. 1.

With reference to FIG. 2, shown is a functional block diagram of the primary components of the authentication system 143 as it interacts with other components according to an embodiment of the present invention. As shown in FIG. 2, each block represents a module, object, or other grouping or encapsulation of underlying functionality as implemented in programming code. However, the same underlying functionality may exist in one or more modules, objects, or other groupings or encapsulations that differ from those shown in FIG. 2 without departing from the present invention as defined by the appended claims.

The authentication system 143 includes an authentication manager 153 and a number of authentication agents 156. According to an aspect of the present invention, the authentication system 143 can include any number of authentication agents 156. Communication between the authentication manager 153 and the authentication agents 156 is accomplished by sending appropriate calls and responses to each other as is customary in an object-oriented environment.

The authentication system 143 also includes an agent priority table 159. The agent priority table 159 is generated by the authentication manager 153 to track the existence of the authentication agents 156. The authentication system 143 also interfaces with the user input devices 126 and with external authentication services 163 to obtain authentication of user parameters as will be described. In addition, the authentication system 143 interfaces with an application 166 that is implemented upon successful authentication of a user. In the case of the multi-function peripheral 103 (FIG. 1), the application 166 may be a feature or function of the multi-function control system 139. For example, the application 166 might be the digital sending function, copy function, or print function, etc.

Next, the operation of the authentication system 143 is described. To begin, upon startup of the multi-function peripheral 103, the authentication manager 153 executes a method to discover all of the authentication agents 156 that are stored in the memory 116. The discovery of the authentication agents 156 is accomplished, for example, using the Component Object Model (COM) created by Microsoft Corporation of Redmond, Wash. The COM architecture allows for the discovery of objects by employing a category manager with which objects are registered. For a discussion of the COM architecture, see Dale Rogerson, *Inside COM*, Microsoft Press, Redmond, Wash., 1997, the entire text of which is incorporated herein by reference.

The discovered authentication agents 156 are then listed in the agent priority table 159 that is ultimately consulted by the authentication manager 153 in sending authentication requests to the respective authentication agents 156. Each of the authentication agents 156 includes a priority level value. The order in which the authentication agents 156 are listed in the agent priority table 159 is based upon the priority level values within each of the authentication agents 156. Alternatively, the order in which the authentication agents 156 are listed in the agent priority table 159 may depend upon the order in which each of the authentication agents 156 was registered or included in the authentication system 143, or the order may be determined in some other manner.

The discovery of the authentication agents 156 in this manner points to the fact that the authentication system 143 is extensible in that there is no static coupling between the authentication manager 153 and the authentication agents 156. That is to say, the authentication manager 153 does not know how many authentication agents 156 there are until discovered. The fact that such static coupling does not exist in the architecture of the authentication agent 143 allows for the easy addition of authentication agents 156 thereto in specific applications without having to modify the authentication manager 153. Specifically, if a new type of authentication is desired for a particular function, all that is necessary is that a new authentication agent 156 be created and added to the authentication system 143, thus reducing time and effort to accomplish such a modification. The extensibility of the authentication system 143 is further reflected in other interaction between the authentication manager 153 and the authentication agents 156 as will be discussed.

Each of the authentication agents 156 is configured to perform an authentication task that provides for the authentication of at least one user parameter that is supplied by a user by virtue of the user input devices 126. Each authentication agent 156 may authenticate one or more user parameters supplied by the user. The user parameters that are authenticated by a respective agent 156 may include at least one parameter that may or may not be unique with respect to the remaining authentication agents 156.

According to one aspect of the present invention, when a particular authentication agent 156 wishes to authenticate a parameter that was supplied by a user, then the authentication agent 156 may communicate with an appropriate external authentication service 163. Such an external authorization service 163 serves to authenticate the specific parameter. For example, the external authentication service 163 may reside in a server coupled to a local area network or other network. Assume that the multi-function peripheral 103 is also coupled to the same network. Such an external authentication service 163 may be employed, for example, to verify that a specific username or password associated with a user that has access to a computer system on the network as can be appreciated by those with ordinary skill in the art.

Alternatively, the authentication agent 156 may include the functionality that causes the authentication of a particular parameter by itself without the use of an external authentication service 163. The actual act of authentication may involve, for example, comparing an unauthenticated parameter with a table or database of known parameters for a match. When a match occurs, the parameter has been authenticated. Note there are many other approaches that may be employed to authenticate parameters as is generally known to those with ordinary skill in the art.

Assuming that a user wishes to employ the multi-function peripheral 103 (FIG. 1) to perform a specific function such as transmitting a document by way of a digital sender, etc., then the user indicates the desired function through an appropriate user input device 126. The authentication manager 153 then implements a "Request Authentication" method to obtain authentication of the user. Upon executing the Request Authentication method, the authentication manager 153 consults the agent priority table 159 to determine the first authentication agent 156 that is to be called upon to authenticate a particular parameter of the user.

The authentication manager 153 then sends a message to such authentication agent 156 that includes the desired function that the user wishes to implement on the multi-function peripheral 103. Upon being called by the authentication manager 153 to authenticate the user, the first authentication agent 156 determines whether it is supposed to authenticate the user for the function that the user wishes to implement. That is to say, a particular authentication agent 156 may or may not be used to authenticate a user for a predetermined function of the multi-function peripheral 103.

Assuming that the authentication agent 156 does perform an authentication procedure for the desired function, then the authentication agent 156 executes a method to query the user to enter or otherwise provide a user parameter for authentication. Assuming the user parameter is authenticated, the authentication agent 156 returns a "valid" message to the authentication manager 153 indicating that the user was authenticated. The authentication manager 153 then moves to obtain authentication from the next authentication agent 156, if there are any remaining to query. If the authentication was unsuccessful, then the authentication agent 156 returns a "rejected" message indicating that the user has not been authenticated. In such case, the authentication manager 153 responds by denying the user access to the desired function of the multifunction peripheral 103 or other device.

If it is the case that the authentication agent 156 does not perform authentication for the desired function, then the authentication agent 156 returns a "valid" message to the authentication manager 153 indicating that the user has been authenticated. This action provides further evidence of the extensibility of the architecture of the authentication system 143. In particular, if an authentication agent 156 is not to perform an authentication task for a specific desired function to be accessed, then by sending a "valid" reply, the authentication manager assumes that the user was authenticated by the specific authentication agent 156 an proceeds accordingly. Alternatively, a separate message may be sent to the authentication manager 153 by the authentication agent 156 that indicates that the authentication agent 156 does not perform authentication for the desired function. In such case, the authentication manager 153 should be configured to recognize such a message. In any event, the authentication manager 153 would proceed with the authentication procedure regardless of whether a "valid" message or an "inapplicable" message is received from the authentication agent 156.

To authenticate a user, an authentication agent 156 first obtains the user parameter through an appropriate user input device 126. Thereafter, the authentication agent 156 either performs the authentication of the user parameter itself or requests an external authentication service 163 to authenticate the user parameter.

In implementing the Request Authentication method, the authentication manager 153 sends an authentication request to each one of the authentication agents 156 based upon the position in the agent priority table 159. Upon receiving a response that indicates that the authentication was a success from any one of the authentication agents 156, then the authentication manager 153 proceeds to request authentication from the next authentication agent 156 listed in the agent priority table 159 until the last authentication agent 156 is queried. When the last authentication agent 156 has indicated that the user has been authenticated whether the authentication agent 156 performs an authentication task or is bypassed, then the authentication manager 153 returns the final authentication result (i.e. passed or failed) to the multifunction control system 139. The multifunction control system 139 then either allows or prevents the desired function in the multifunction peripheral 153 that the user wishes to access.

Figure 3:
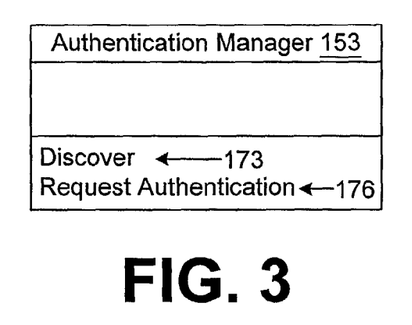
FIG. 3 is a block diagram of an authentication manager included in the authentication system of FIG. 2.
Figure 4:
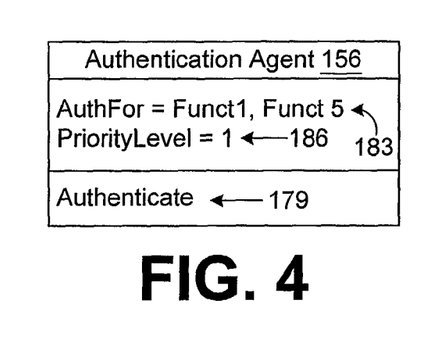
FIG. 4 is a block diagram of an authentication agent included in the authentication system of FIG. 2.

Turning to FIGS. 3 and 4, shown are block diagrams of the authentication manager 153 and the authentication agent 156 according to an aspect of the present invention. In this respect, the authentication manager 153 includes a "discover" method 173 and a "request authentication" method 176. The authentication agent includes an "authenticate" method 179 that is implemented to authenticate the user. Also associated with the authentication agent 156 are function variables 183 and a priority level variable 186. The function variables 183 identify those functions of the multifunction peripheral 103 or other device for which the authentication agent 156 implements the Authenticate method 179. The priority level variable 186 provides a benchmark by which the authentication agent 156 is to be listed in the agent priority table 159 (FIG. 2).

Figure 5:
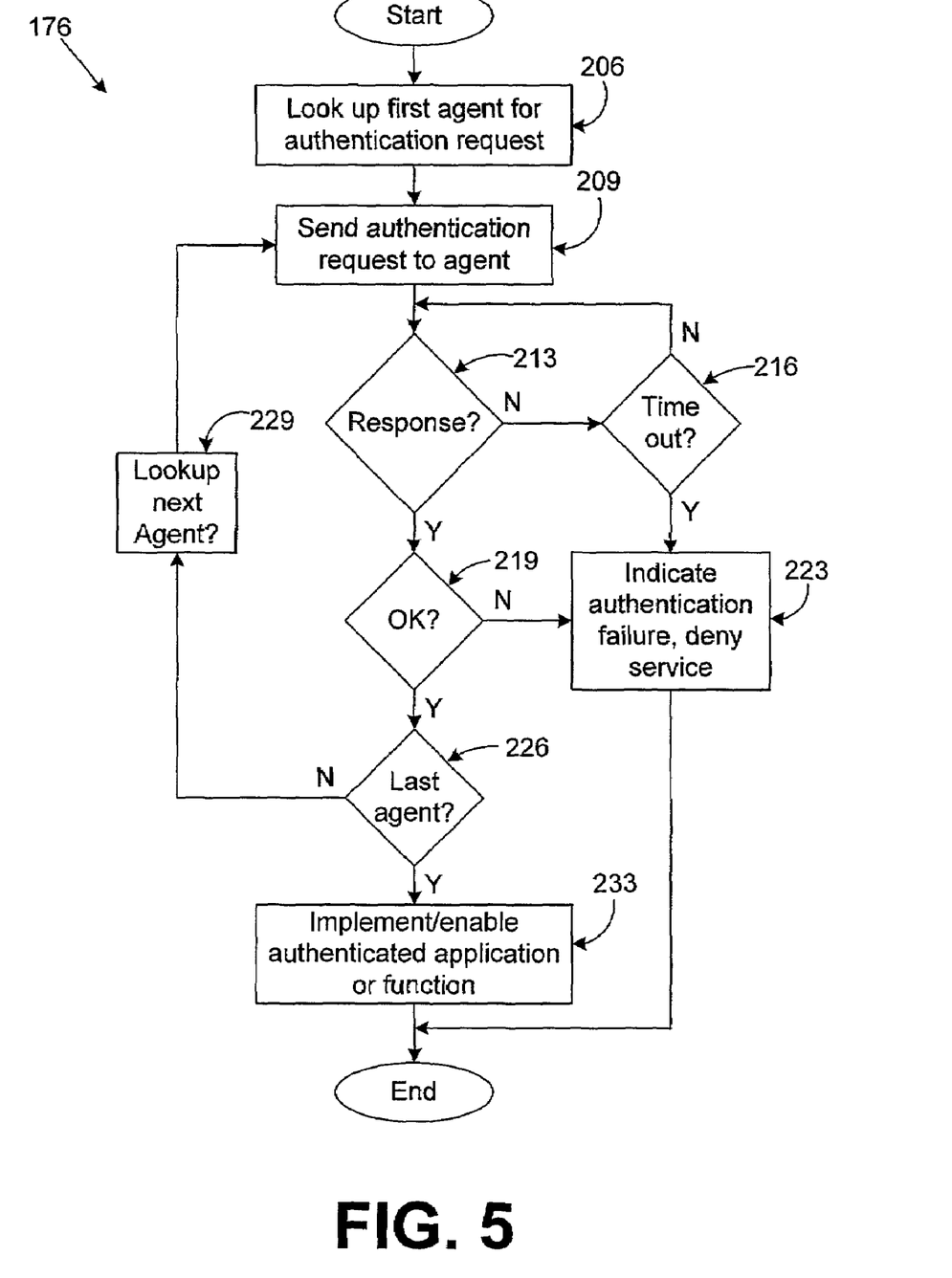
FIG. 5 is a flow chart of a "Request Authentication" method implemented in the authentication manager of FIG. 3.

With reference to FIG. 5, shown is a flowchart of the Request Authentication method 176 according to an aspect of the present invention. Alternatively, the flowchart of FIG. 5 may be viewed as depicting steps in a method implemented in the multi-function peripheral 103 in authenticating a user.

Beginning with box 206, the first authentication agent 156 (FIG. 2) to which an authentication request is to be sent is looked up in the agent priority table 159 (FIG. 2). Thereafter, in box 209 the Request Authentication method 176 sends an authentication request to the authentication agent 156 identified in box 206. Then, in box 213 the Request Authentication method 176 determines whether it has received a response from the authentication agent 156 (FIG. 2). If not, then the request authentication 176 proceeds to box 216 in which it is determines whether a time-out period has tolled.

The time-out is a predefined value that is stored in the memory 116. The authentication system 143 includes a timer that tracks whether or not the time that the authentication manager 153 waits for a response from the respective authentication agent 156 has gone beyond the predefined time-out. If there is no time-out in block 216, then the Request Authentication method 176 reverts back to box 213.

If a response is received from the authentication agent 156 in box 213, then the Request Authentication method 176 proceeds to box 219. In box 219, the Request Authentication method 176 determines whether the response from the authentication agent 156 indicates whether the user has been authenticated or whether the user was not successfully authenticated. Specifically, such response may indicate that the user is "valid" or "rejected", etc. If the authentication was unsuccessful, then the Request Authentication method 176 proceeds to box 223. The Request Authentication method 176 also proceeds to box 223 upon an occurrence of a time-out in box 216. In box 223 an indication of an authentication failure is provided to the user through an appropriate display device 123 (FIG. 1) and the user is denied access to the desired function of the multifunction peripheral 103. Thereafter, the Request Authentication method 176 ends as shown.

With reference back to box 219, if the response from the authentication agent 156 indicates that the authentication of the user was successful, then the Request Authentication method 176 proceeds to box 226 in which it is determined whether authentication agents 156 remain in the agent priority table 159 to which an authentication request has not been sent. If so, then the Request Authentication method 176 moves to box 229 in which the next authentication agent 156 is looked up in the agent priority table 159. Thereafter, the Request Authentication method 176 reverts back to box 209 to interface with the next authentication agent 156 to perform the next authentication task. With reference back to box 226, if the last authentication agent 156 has performed its authentication task as requested by the Request Authentication method 176, then the Request Authentication method 176 proceeds to box 233 in which an appropriate application 166 is implemented that enables the desired function within the multi-function peripheral 103 for use by the user. It is understood that the authentication system 143 (FIG. 2) may be employed with any appropriate system or device and that the multifunction peripheral 103 is discussed herein merely to provide an example of the use of the authentication system 143.

Figure 6:
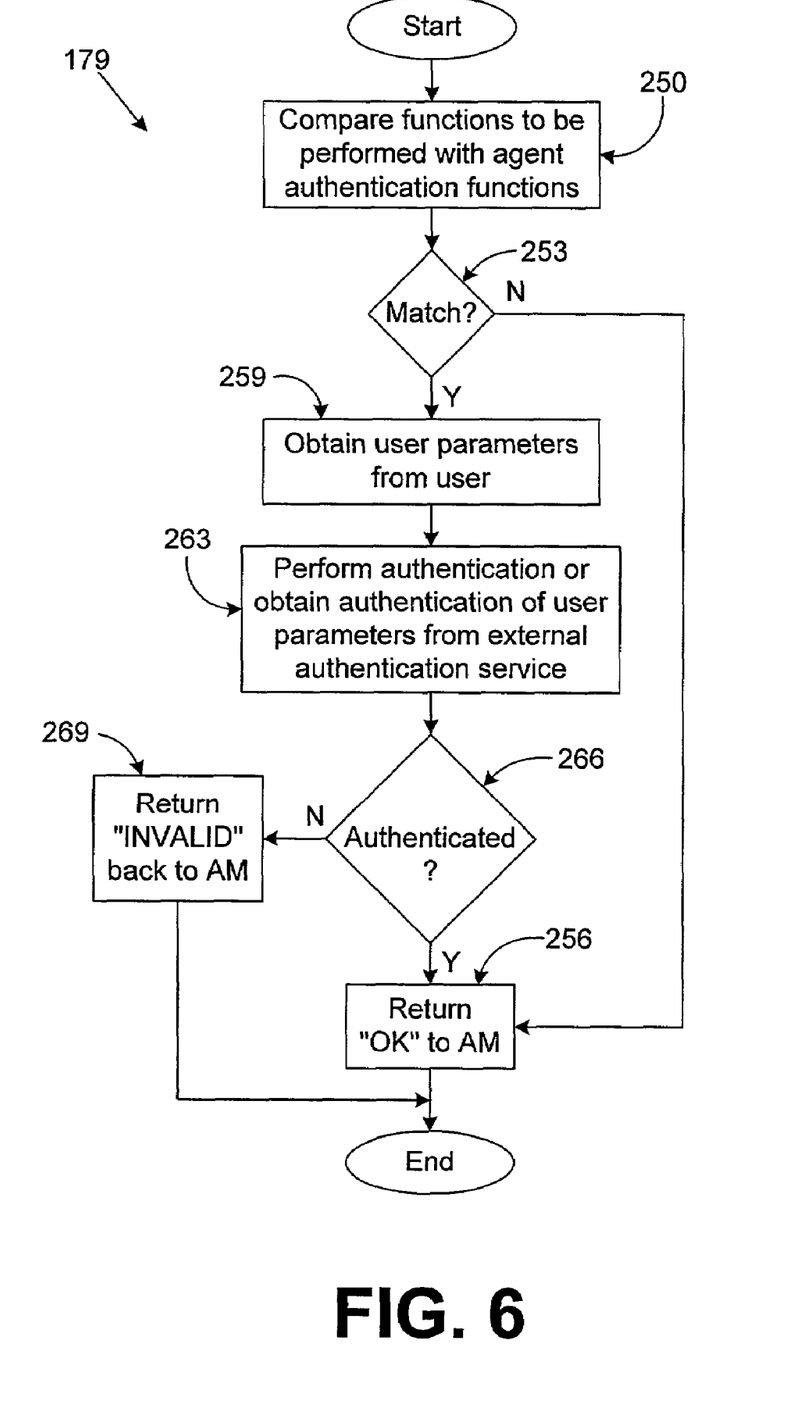
FIG. 6 is a flow chart of an "Authenticate" method implemented in the authentication agent of FIG. 4.

With reference to FIG. 6, shown is a flowchart of the Authenticate method 179 according to another aspect of the present invention. Alternatively, the flowchart of FIG. 6 may be viewed as depicting steps in a method implemented in the multi-function peripheral 103 according to the present invention. The Authenticate method 179 is implemented within the authentication agent 156 (FIG. 2) in order to perform or broker the performance of an authentication task as requested by the authentication manager 153 (FIG. 2).

Beginning with box 250, the Authenticate method 179 first receives the authentication request from the authentication manager 153. The authentication request identifies the function that a user wishes to employ in the multi-function peripheral 103 for which the user is to be authenticated. The function may be identified, for example, as an attribute in the request. In box 250 the Authenticate method 179 compares the function in the request with the function variables 183 (FIG. 4) associated with itself. Then, in box 253, if a match between the supplied function and one of the function variables 183 is not detected, then the Authenticate method 179 proceeds to box 256 in which a message is sent back to the authentication manager 153 that indicates that the authentication was successful. This is done even though there was no authentication performed since the authentication agent 156 does not perform authentication services for the particular function in question as was described above. Alternatively, a response may be sent to the authentication manager 153 that the authentication agent 156 is not applicable to the specified function. In such case, the authentication manager 153 assumes that the authentication was successful and proceeds to request authentication from the remaining authentication agents 156 as described previously.

With reference back to box 253, if there is a match detected between the function in the request and the function variables 183 associated with the authentication agent 156, then the Authenticate method 179 proceeds to box 259 in which user parameters are obtained from the user through an appropriate user input device 126. In this respect, the authentication agent 156 may implement appropriate methods or logic that generate various input interfaces as can be appreciated by those with ordinary skill in the art.

Once the user inputs the user parameters, then the Authenticate method 179 proceeds to box 263 to obtain authentication of the user parameters from an external authentication service 163 (FIG. 2). Alternatively, in box 263, the Authenticate method 179 may perform the authentication function itself. The authentication may entail, for example, comparing the user parameter received from the user with a known list or database of user parameters to determine whether a user is listed as having privileges to perform various functions on the multi-function peripheral 103 or other device.

The various user parameter that may be input into the authentication system 143 for verification by the various authentication agents 156 may include, for example, a user password, pin number, a user name, biometric information such as, fingerprints, retinal scans, voice scans, DNA information, smart card parameters, ID card parameters, and other quantifiable information.

In box 266, the Authenticate method 179 determines whether the user parameters have been authenticated by the external authentication services 163. If in box 266 the authentication has failed, then in box 269 the Authenticate method 179 returns a message to the authentication manager 153 informing the manager that the authentication was unsuccessful. Such a response may include an "invalid" indicator or other indication. Thereafter, the Authenticate method 179 ends accordingly.

On the other hand, if the authentication was successful in box 263, then the Authenticate method 179 proceeds to box 256 in which a message is returned to the authentication manager 153 indicating that the authentication of the user parameter was successful. Thereafter, the Authenticate method ends accordingly.

With reference back to FIG. 2, the architecture of the authenticate system 143 provides several advantages. One of these advantages includes the fact that additional authentication tasks may be added to the authentication system by simply adding an appropriate authentication agent 156 without making any change to the authentication manager 153 or existing authentication agents 156, etc. Also, to create a new authentication agent 156, an existing authentication agent 156 may be copied and modified rather than creating the new authentication agent 156 from scratch. Other advantages of the present invention will be apparent to one with ordinary skill in the art.

With reference back to FIG. 2, although the authentication system 143 of the present invention is embodied in software or code executed by general purpose hardware as discussed above, as an alternative the authentication system 143 may also be embodied in dedicated hardware or a combination of software/general purpose hardware and dedicated hardware. If embodied in dedicated hardware, the authentication system 143 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagrams and/or flow charts of FIGS. 2–6 show the architecture, functionality, and operation of an implementation of the authentication system 143. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the block diagrams and/or flow charts of FIGS. 2–6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention. Also, the block diagrams and/or flow charts of FIGS. 2–6 show are relatively self-explanatory and are understood by those with ordinary skill in the art to the extent that software and/or hardware can be created by one with ordinary skill in the art to carry out the various logical functions as described herein.

Also, where the authentication system 143 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the authentication system 143 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A system for authentication, comprising:
a processor circuit having a processor and a memory; and
an authentication system stored in the memory and executable by the processor, the authentication system comprising:
a plurality of authentication agents, each of the authentication agents authenticating at least one user parameter by performing at least one authentication task;
an authentication manager that requests each of the authentication agents to authenticate an unauthenticated user parameter until all of the authentication agents have been requested to authenticate the unauthenticated user parameter and the authenticated user parameter is authenticated by at least one of the authentication agents, unless one of the authentication agents fails to authenticate the unauthenticated user parameter;
wherein the unauthenticated user parameter that all of the authentication agents are requested to authenticate is identical for each of the authentication agents; and
wherein each authentication agents is configured to transmit a valid response that indicates to the authentication manager that the respective authentication agent has authenticated the unauthenticated user parameter even though the respective authentication agent is not configured to perform a respective authentication task that is necessary to authenticate the unauthenticated user parameter.

2. The system of claim 1, wherein the authentication manager waits for a response from each of the authentication agents, each response indicating whether the unauthenticated user parameter has been authenticated.

3. The system of claim 1, comprising:
an external authentication service; and
wherein at least one of the authentication agents calls upon the external authentication service to authenticate the unauthenticated user parameter.

4. A system for authentication, comprising:
a processor circuit having a processor and a memory; and
an authentication system stored in the memory and executable by the processor, the authentication system comprising:
a plurality of authentication agents, each of the authentication agents authenticating at least one user parameter by performing at least one authentication task, wherein a parameter type associated with each of the authentication agents;
an authentication manager that requests each of the authentication agents to authenticate an unauthenticated user parameter, wherein the unauthenticated user parameter that all of the authentication agents are requested to authenticate is identical for each of the authentication agents; and
wherein each of the authentication agents authenticates the unauthenticated user parameter when the unauthenticated user parameter is of the parameter type associated with the respective authentication agent; and
wherein:
each of the authentication agents transmits an invalid response to the authentication manager upon a failure to authenticate the unauthenticated user parameter;
each of the authentication agents transmits a valid response to the authentication manager upon a successful authentication of the unauthenticated user parameter; and
each of the authentication agents transmits a valid response to the authentication manager that indicates to the authentication manager that the respective authentication agent has authenticated the unauthenticated user parameter even though the respective authentication agent is not configured to perform a respective authentication task that is necessary to authenticate the unauthenticated user parameter.

5. The system of claim 1, wherein:
each of the authentication agents transmits an invalid response to the authentication manager upon a failure to authenticate the unauthenticated user parameter; and
each of the authentication agents transmits a valid response to the authentication manager when the unauthenticated user parameter is successfully authenticated.

6. A system for authentication, comprising:
a processor circuit having a processor and a memory; and
an authentication system stored in the memory and executable by the processor, the authentication system comprising:
a plurality of authentication agents, each of the authentication agents authenticating at least one user parameter by performing at least one authentication task;
an authentication manager that requests each of the authentication agents to authenticate an unauthenticated user parameter, wherein the unauthenticated user parameter that all of the authentication agents are requested to authenticate is identical for each of the authentication agents;
wherein, upon startup, the authentication manager is unaware of how many of the authentication agents exist in association with the authentication system and the authentication manager discovers the authentication agents; and
wherein each of the authentication agents is configured to transmit a valid response that indicates to the authentication manager that the respective authentication agent has authenticated the unauthenticated user parameter even though the respective authentication agent is not configured to perform a respective authentication task that is necessary to authenticate the unauthenticated user parameter.

7. The system of claim 6, wherein the authentication manager is configured to generate a lookup table listing each of the authentication agents during startup after the authentication agents are discovered.

8. An authentication method, comprising:

executing a plurality of authentication agents in a computer system, each of the authentication agents being configured to perform at least one authentication task; and sequentially requesting each of the authentication agents to authenticate an unauthenticated user parameter input into the computer system until all of the authentication agents have been requested to authenticate the unauthenticated user parameter and the authenticated user parameter is authenticated by at least one of the authentication agents, unless one of the authentication agents fails to authenticate the unauthenticated user parameter, wherein the unauthenticated user parameter that all of the authentication agents are requested to authenticate is identical for each of the authentication agents; and generating a valid response in at least one of the authentication agents that is sent to the authentication manager that indicates to the authentication manager that the at least one of the authentication agents has authenticated the unauthenticated user parameter even though the at least one of the authentication agents is not configured to perform a respective authentication task that is necessary to authenticate the unauthenticated user parameter.

9. The authentication method of claim 8, comprising requesting an external authentication service to authenticate the at least one user parameter.

10. An authentication method, comprising:

executing a plurality of authentication agents in a computer system, each of the authentication agents being configured to perform at least one authentication task;

executing an authentication manager in the computer system to sequentially request each of the authentication agents to authenticate an unauthenticated user parameter input into the computer system, wherein the unauthenticated user parameter that all of the authentication agents are requested to authenticate is identical for each of the authentication agents;

transmitting an invalid response from at least one of the authentication agents to the authentication manager upon a failure to authenticate a respective user parameter;

transmitting a valid response from at least one of the authentication agents to the authentication manager upon a successful authentication of the unauthenticated user parameter; and transmitting the valid response from at least one of the authentication agents to the authentication manager that indicates to the authentication manager that the respective authentication agent has authenticated the unauthenticated user parameter even though the respective authentication agent is not configured to perform a respective authentication task that is necessary to authenticate the unauthenticated user parameter.

11. The authentication method of claim 8, further comprising:

transmitting an invalid response to the authentication manager upon a failure to authenticate the unauthenticated user parameter; and transmitting a valid response to the authentication manager when the unauthenticated user parameter is successfully authenticated.

12. An authentication method, comprising:

executing a plurality of authentication agents in a computer system, each of the authentication agents being configured to perform at least one authentication task;

executing an authentication manager in the computer system, wherein the authentication manager is unaware of how many of the authentication agents exist when the authentication manager is first executed;

discovering the authentication agents with the authentication manager upon execution of the authentication manager;

employing the authentication manager to sequentially request each of the authentication agents to authenticate an unauthenticated user parameter input into the computer system, wherein the unauthenticated user parameter that all of the authentication agents are requested to authenticate is identical for each of the authentication agents; and obtaining a response from each of the authentication agents indicating whether the unauthenticated user parameter has been authenticated, wherein each of the authentication agents is configured to generate a valid response that indicates to the authentication manager that the respective authentication agent has authenticated the unauthenticated user parameter even though the respective authentication agent is not configured to perform a respective authentication task that is necessary to authenticate the unauthenticated user parameter.

13. The authentication method of claim 12, further comprising employing the authentication manager to generate a lookup table listing each of the authentication agents after the authentication agents are discovered upon execution of the authentication manager.

14. A computer program embodied on a computer readable storage medium and executable by a computer system for performing authentication, comprising:

code that embodies a plurality of authentication agents, each of the authentication agents authenticating at least one user parameter by performing at least one authentication task;

code that embodies an authentication manager that requests each of the authentication agents to authenticate an unauthenticated user parameter until all of the authentication agents have been requested to authenticate the unauthenticated user parameter and the authenticated user parameter is authenticated by at least one of the authentication agents, unless one of the authentication agents fails to authenticate the unauthenticated user parameter, wherein the unauthenticated user parameter that all of the authentication agents are requested to authenticate is identical for each of the authentication agents; and wherein each of the authentication agents is configured to transmit a valid response that indicates to the authentication manager that the respective authentication agent has authenticated the unauthenticated user parameter even though the respective authentication agent is not configured to perform a respective authentication task that is necessary to authenticate the unauthenticated user parameter.

15. The computer program embodied on a computer readable storage medium and executable by the computer system of claim 14, wherein the authentication manager further comprises code that waits for a response from each of the authentication agents, each response indicating whether the unauthenticated user parameter has been authenticated.

16. The computer program embodied on a computer readable storage medium and executable by the computer system of claim 14, wherein at least one of the authentication agents further comprises code that calls upon an external authentication service to authenticate the unauthenticated user parameter.

17. A computer program embodied on a computer readable storage medium and executable by a computer system for performing authentication, comprising:
- code that embodies a number of authentication agents, each of the authentication agents authenticating at least one user parameter by performing at least one authentication task;
- code that embodies an authentication manager that requests each of the authentication agents to authenticate an unauthenticated user parameter, wherein the unauthenticated user parameter that all of the authentication agents are requested to authenticate is identical for each of the authentication agents; and
- wherein each of the authentication agents further comprises:
- code that transmits an invalid response to the authentication manager upon a failure to authenticate the unauthenticated user parameter;
- code that transmits a valid response to the authentication manager upon a successful authentication of the unauthenticated user parameter; and
- code that transmits a valid response to the authentication manager that indicates to the authentication manager that the respective authentication agent has authenticated the unauthenticated user parameter even though the respective authentication agent is not configured to perform a respective authentication task that is necessary to authenticate the unauthenticated user parameter.

18. The computer program embodied on a computer readable storage medium and executable by the computer system of claim 14, wherein each of the authentication agents further comprise:
- code that transmits an invalid response to the authentication manager upon a failure to authenticate the unauthenticated user parameter; and
- code that transmits a valid response to the authentication manager when the unauthenticated user parameter is successfully authenticated.

19. A computer program embodied on a computer readable storage medium and executable by a computer system for performing authentication, comprising:
- code that embodies a number of authentication agents, each of the authentication agents authenticating at least one user parameter by performing at least one authentication task;
- code that embodies an authentication manager that requests each of the authentication agents to authenticate an unauthenticated user parameter, wherein the unauthenticated user parameter that all of the authentication agents are requested to authenticate is identical for each of the authentication agents;
- wherein the authentication manager further comprises code that discovers the authentication agents upon an initial execution of the authentication manager, the authentication manager being unaware at the time of initial execution of how many of the authentication agents exist that may be requested by the authentication manager to authenticate the unauthenticated user parameter; and wherein each of the authentication agents further comprises code that generates a valid response that indicates to the authentication manager that the respective authentication agent has authenticated the unauthenticated user parameter even though the respective authentication agent is not configured to perform a respective authentication task that is necessary to authenticate the unauthenticated user parameter.

20. The computer program embodied on a computer readable storage medium and executable by the computer system of claim 19, wherein the authentication manager further comprises code that generates a lookup table listing each of the authentication agents after initial execution after the authentication agents are discovered.

* * * * *

UNITED STATES PATENT AND TRADEMARK OFFICE
CERTIFICATE OF CORRECTION

| | | |
|---|---|---|
| PATENT NO. | : 7,219,231 B2 | Page 1 of 1 |
| APPLICATION NO. | : 10/060780 | |
| DATED | : May 15, 2007 | |
| INVENTOR(S) | : Travis Myron Cossel et al. | |

It is certified that error appears in the above-identified patent and that said Letters Patent is hereby corrected as shown below:

In column 11, line 56, in Claim 1, after "each" insert -- of the --.

Signed and Sealed this

Fifth Day of May, 2009

JOHN DOLL
*Acting Director of the United States Patent and Trademark Office*